June 17, 1930.   C. T. JAMISON   1,764,958
AUTOMOBILE SIGNAL SWITCH
Filed Oct. 12, 1925
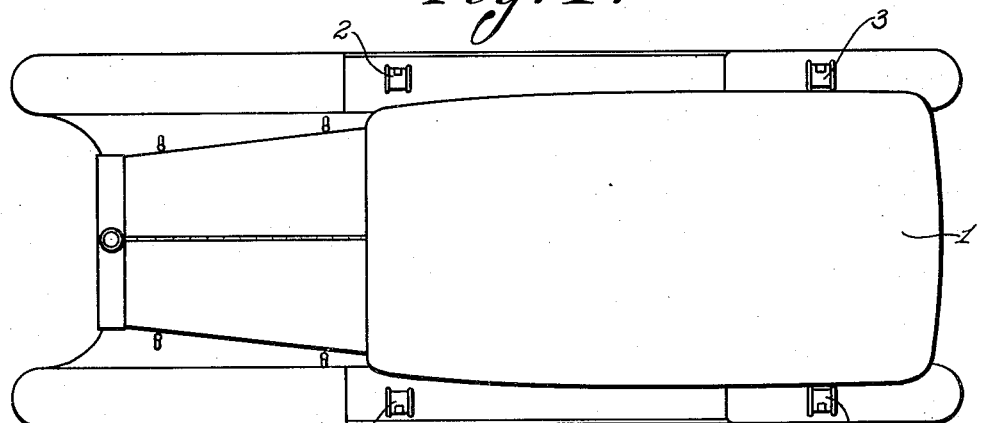
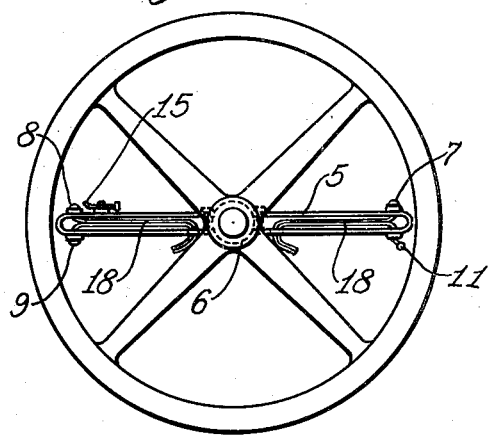
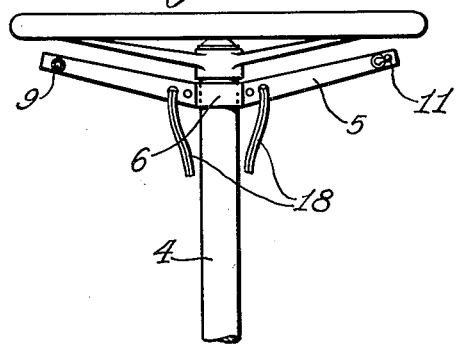
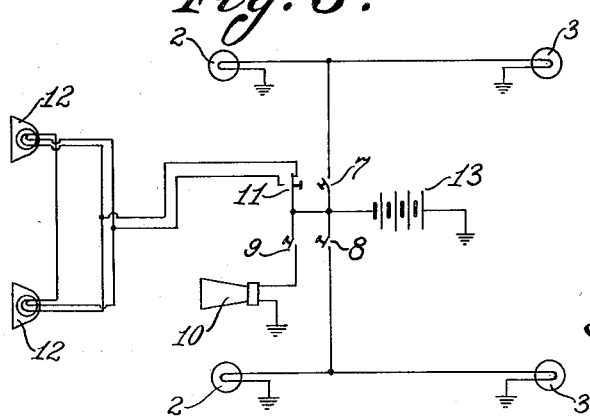
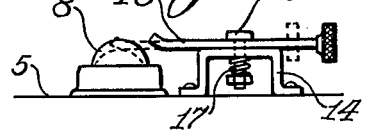
Inventor:
CLAUDE T. JAMISON,
By John W. Bruninga.
His Attorney.

Patented June 17, 1930

1,764,958

UNITED STATES PATENT OFFICE

CLAUDE T. JAMISON, OF ALTON, ILLINOIS, ASSIGNOR TO DAY AND NIGHT AUTO SAFETY SIGNAL COMPANY, OF ALTON, ILLINOIS, A CORPORATION OF DELAWARE

AUTOMOBILE SIGNAL SWITCH

Application filed October 12, 1925. Serial No. 62,115.

This invention pertains to signalling devices for automobiles and the like.

One of the objects of this invention is to provide means whereby the driver of a vehicle may signal his intention of turning or stopping or the like.

Another object is to provide means whereby such signals may be made in a simple and convenient manner and in such a way as to be readily recognized by drivers of approaching vehicles and others.

Further objects will appear from the following description taken in connection with the accompanying drawing in which:

Figure 1 is a plan view of an automobile equipped with signalling devices in accordance with this invention.

Figure 2 is a top view of the steering wheel equipped in accordance with this invention.

Figure 3 is a rear view of the same.

Figure 4 is a detail of the parking switch, and

Figure 5 is a connecting diagram.

In accordance with this invention signal lights are placed on the car so as to be visible from the front, rear or either side. Suitable circuit closing devices are mounted adjacent to the steering wheel within easy reach of the driver's hand. The circuit closing devices as well as the signal lights are so arranged that by suitable manipulation of said devices by the driver, his intention may be clearly indicated to those outside the vehicle, such as drivers of other vehicles, traffic officers and the like.

Referring to the drawing, 1 indicates an automobile which is equipped with side signalling lights 2 and rear signalling lights 3. There is a pair of lights 2, one on each side and near the front. These may be in the position ordinarily occupied by the side lights or they may be placed on the front fender or at any other suitable location. A similar pair of rear lights 3, is placed so as to be visible from the rear and at least one of them from either side of the vehicle. These are ordinarily placed on the rear fenders. By this arrangement, one of the lights 2 may be used to flash a signal to the front and one side while one of the lights 3 will flash a signal to the rear and one side. Furthermore, the two lights of each pair 2 and 3 may be used in combination to flash a signal to the front or rear respectively.

Mounted on the steering column 4 is a double arm bracket 5. This bracket is formed with each arm doubled as shown in Fig. 2. The same may be constructed of strips of metal bent double at its ends and formed to provide a central collar 6 which may be clamped about the steering collar.

As shown in Figure 2, the bracket 5 has mounted thereon a circuit closing button 7 which is connected as shown in Figure 5, so as to light the right hand signal of each pair 2 and 3. Similarly on the left hand arm of the bracket 5 a button 8 is connected to light the left hand light of each pair 2 and 3. Mounted in the rear on the left hand end of the bracket 5 is a horn button 9, connected as shown in Figure 2 so as to sound the horn 10 when the circuit is closed thereby. On the rear of the left hand arm of the bracket 5 is a dimmer switch 11 connected in any suitable manner so as to dim the headlights 12 when properly manipulated. The battery 13 is connected so as to provide current for operating these devices. By mounting the buttons symmetrically on the arms at the front and rear of the arms, a convenient finger manipulation of the buttons in a direction generally tangential to the wheel is permitted. This is obviously the most convenient arrangement of buttons that could be provided.

It will be clear that by means of the four lights 2 and 3, and the control buttons 7, 8, 9 and 11, complete control of signaling devices on the car is possible. Each side light 2 may be arranged to show a white light toward the front and side and may show either a red light or be dark as seen from the rear. The lights 3 are ordinarily arranged to show a red light in the rear, a white light toward the side and are dark as seen from the front.

In using these signals, if the operator desires to indicate a turn to the right he will operate the control button 7 thereby lighting both the right hand signals 2 and 3. This will indicate to the front side and rear that a right turn is intended. Similarly, by operating the control button 8 a left turn may be signaled by means of the left hand lights 2 and 3. In either of these cases the signal is also visible from the side so that vehicles approaching from that side will be warned accordingly. The horn button 9 is within easy reach of the left hand. In similar manner the dimmer switch 11 is within easy reach of the right hand. In case the driver desires to back his car he may signal such intention by operating the buttons 7 and 8 alternately in rapid succession. This will show a series of alternate flashes on the two rear lights 3 so as to warn anyone in the rear of the car that the driver intends to back.

Mounted on the left hand arm adjacent the button 8 is a bracket 14 which carries a sliding keeper 15 which has a slotted connection with a bolt 16 surrounded by a spring 17 which serves to maintain the keeper 15 in close frictional contact with the bracket 14. By depressing the button 8 and sliding the keeper 15 to the left as indicated by dotted lines in Figure 4, the keeper will maintain the button 8 in circuit closed position so that the left hand lights 2 and 3 will be kept lit. Accordingly, these lights may then be used as parking lights when the car stands idle at night.

It will be seen, therefore, that this invention provides simple and effective means for signaling the driver's intention so as to warn others and prevent accidents. The arms are extended a distance approximately equal to the radius of the steering wheel, as clearly shown in Figs. 2 and 3, and this position of the double arm bracket 5 just underneath the steering wheel brings the control buttons within easy reach of the driver's fingers at all times, making it possible for the operator to signal without removing the hands from the wheel. Every ordinary intention of the driver may be signaled, whether right or left turn, backing or stopping, in the last case buttons 7 and 8 being closed simultaneously and held so in order that both rear signals 3 may be shown, the continuous showing of both signals being understood to indicate intention to stop.

The leads 18 passing to the control buttons 7, 8, 9, and 11 may pass within the double arms of the bracket 5 so as to be inconspicuous and also so as to be protected against injury or derangement. Thus leads may pass out near the steering column 4 and then along said column to their respective circuits.

It is obvious that various changes may be made in details of construction without departing from the spirit of this invention; it is, therefore, understood that the invention is not to be limited to the specific details shown and described.

Having thus described the invention, what is claimed is:

1. In an automobile having a steering column, a bracket on said column having an arm, said arm comprising two portions joined at the end thereof, a control button on each arm portion and leads to said buttons passing within said arm.

2. As an article of manufacture, a switch bracket comprising a central clamp, a laterally extending U-shaped arm, and a plurality of switches mounted in symmetrical relation, one on each portion of said arm.

3. In an automobile having a steering wheel and column, a switch bracket mounted on said column and having an arm extending from said column a distance substantially equal to the radius of said wheel, said arm being formed of two portions connected at their outer ends, a button mounted on each arm portion and having leads passing along said arm, said buttons being located for depression in a direction tangent to the wheel rim.

4. In an automobile having a steering column and a steering wheel, a bracket on the steering column having a pair of laterally extending U-shaped arms, terminating adjacent diametrically opposite points on the rim of the steering wheel and control buttons placed on opposite ends of said arms, the buttons on each end of each arm being mounted in symmetrical relation, one on each portion of each arm to permit cooperative manipulation thereof by the hands in steering position on the steering wheel.

5. In an automobile having a steering column, a bracket on said column having a pair of arms terminating adjacent diametrically opposite points on the rim of the steering wheel, each arm comprising two portions joined at the end thereof, a control button on each arm portion, and leads to said buttons passing along said arms, one of said arm portions having a sliding latch mounted thereon adjacent its control button, and effective to permit retention of said button in closed position.

In testimony whereof I affix my signature this 18th day of September, 1925.

CLAUDE T. JAMISON.